(12) United States Patent
Fletcher et al.

(10) Patent No.: US 11,064,283 B2
(45) Date of Patent: Jul. 13, 2021

(54) CONVERTIBLE HEAD WEARABLE AUDIO DEVICES

(71) Applicant: RM ACQUISITION, LLC, Skokie, IL (US)

(72) Inventors: Stephen A. Fletcher, Chicago, IL (US); Venkatesh Rao, Cary, IL (US); Wei Wu, Park Ridge, IL (US)

(73) Assignee: RM ACQUISITION, LLC, Chicago, IL (US)

( * ) Notice: Subject to any disclaimer, the term of this patent is extended or adjusted under 35 U.S.C. 154(b) by 0 days.

(21) Appl. No.: 16/291,071

(22) Filed: Mar. 4, 2019

(65) Prior Publication Data
US 2020/0288234 A1  Sep. 10, 2020

(51) Int. Cl.
*H04R 1/10*   (2006.01)
*H04R 1/08*   (2006.01)
(Continued)

(52) U.S. Cl.
CPC ........... *H04R 1/1066* (2013.01); *H04R 1/083* (2013.01); *H04R 1/1008* (2013.01); *H04M 1/05* (2013.01); *H04M 1/6066* (2013.01); *H04R 1/1041* (2013.01); *H04R 5/0335* (2013.01); *H04R 2201/107* (2013.01); *H04R 2201/109* (2013.01);
(Continued)

(58) Field of Classification Search
CPC .... H04M 1/65; H04M 1/6066; H04R 1/1083; H04R 1/1066; H04R 1/083; H04R 1/1008; H04R 2420/07; H04R 1/1016; H04R 25/00; H04R 5/033; H04R 1/1041; H04R 2201/107; H04R 2420/05; H04R 2201/105; H04R 5/0335; H04R 2460/01
See application file for complete search history.

(56) References Cited

U.S. PATENT DOCUMENTS 8,335,334 B1 *  12/2012  Luna Rosas ........... H04R 1/105
                                              381/370
2006/0133019 A1 *  6/2006  Yamazaki ............. G06F 1/1616
                                              361/679.21
(Continued)

FOREIGN PATENT DOCUMENTS

CN    203608333 U  *  5/2014

OTHER PUBLICATIONS

Bluetooth Headset for Truckers, Blue Tiger Elite Plus, (Year: 2018).*
(Continued)

*Primary Examiner* — Duc Nguyen
*Assistant Examiner* — Kuassi A Ganmavo
(74) *Attorney, Agent, or Firm* — Marshall, Gerstein & Borun LLP

(57) ABSTRACT

A convertible head wearable audio device is provided that may include a headband having a first earpiece at a first end and a receptacle at a second end. The convertible head wearable audio device may also include a wireless interface. The wireless interface may be configured to communicatively couple the convertible head wearable audio device to a remote device. The convertible head wearable audio device may further include an active noise cancellation module. The active noise cancellation module may be configured to reduce ambient noise from an audio output of the convertible head wearable audio device.

19 Claims, 14 Drawing Sheets

(51) Int. Cl.
    *H04M 1/60*    (2006.01)
    *H04M 1/05*    (2006.01)
    *H04R 5/033*   (2006.01)

(52) U.S. Cl.
    CPC ...... *H04R 2420/05* (2013.01); *H04R 2420/07* (2013.01); *H04R 2460/01* (2013.01)

(56) References Cited

U.S. PATENT DOCUMENTS

| | | | | | |
|---|---|---|---|---|---|
| 2007/0147640 | A1* | 6/2007 | Mottier | ................ | H04R 1/1041 381/111 |
| 2010/0183175 | A1* | 7/2010 | Chen | ................ | H04R 5/04 381/309 |
| 2010/0296666 | A1* | 11/2010 | Lin | ................ | G10K 11/178 381/71.6 |
| 2013/0130749 | A1* | 5/2013 | Andersen | ................ | H04M 1/6066 455/569.1 |
| 2013/0272560 | A1* | 10/2013 | Dougherty | ................ | H04R 1/1066 381/378 |
| 2013/0329905 | A1* | 12/2013 | Awiszus | ................ | H04R 25/00 381/74 |
| 2015/0086059 | A1* | 3/2015 | Gougherty | ................ | H04R 1/105 381/378 |
| 2016/0198254 | A1* | 7/2016 | Gecawicz | ................ | H04R 1/083 381/375 |
| 2016/0198255 | A1* | 7/2016 | Camello | ................ | H04R 1/10 381/74 |
| 2017/0311073 | A1* | 10/2017 | Kang | ................ | G01R 33/02 |
| 2018/0192180 | A1* | 7/2018 | Bruno | ................ | H04R 1/1066 |

OTHER PUBLICATIONS

Audio Technica, ATH-ANC7 Quietpoint Noise Cancelling Headphones (Year: 2007).*
Blue Tiger Elite Headset User Manual, 2009.
Transformer 3 in 1 Convertible Stereo/Mono Headset with Removable Boom Mic, 2019.

* cited by examiner

CONVERTIBLE HEAD WEARABLE AUDIO DEVICES

TECHNICAL FIELD

The present disclosure generally relates to convertible head wearable audio devices. More particularly, the present disclosure relates to head wearable audio devices that may be converted from dual ear piece headphones to a single ear piece headset, and from a single ear piece headset to dual ear piece headphones.

BACKGROUND

Typical headphones include an earpiece (e.g., a speaker) attached to each end of a headband (i.e., dual earpieces). The headphones may be configured to be worn on, or around a user's head, with each earpiece proximate a respective ear (e.g., circumaural (around a user's ears), supra-aural (on a user's ears), ear buds plugged into a user's ear canals, etc.).

A typical headset, on the other hand, may include a single earpiece attached to a first end of a headband and a headpad attached to a second end of the headband. Thereby, one ear of a user may remain uncovered when a headset is in use. A headset may also include a microphone. Accordingly, a headset may provide functionality similar to a telephone handset with hands-free operation.

Many states in the United States of America have laws that prohibit drivers from wearing dual ear piece headphones while driving. For example, headphones, that cover both ears of a user, are not permitted under associated motor vehicle laws of Illinois. Motorcycle helmet audio systems and one-ear headsets and earpieces are exceptions to the general Illinois' laws.

An apparatus is needed that is convertible from a headphone to a headset and from a headset to headphones. More particularly, an apparatus is needed that is compliant with vehicle related laws (e.g., single ear piece headset laws) when a user is driving a vehicle, and that may provide stereo quality headphones when a user is not driving a vehicle.

SUMMARY

A convertible head wearable audio device may include a headband. A first end of the headband may include a first earpiece. A second end of the headband may include a receptacle. The convertible head wearable audio device may also include a wireless interface. The wireless interface may be configured to communicatively couple the convertible head wearable audio device to a remote device. The convertible head wearable audio device may further include an active noise cancellation module. The active noise cancellation module may be configured to counter the effect of ambient noise from an audio output of the convertible head wearable audio device.

In another embodiment, a convertible head wearable audio device may include a headband. A first end of the headband may include a first earpiece. A second end of the headband may include a receptacle. The receptacle may include an engagement mechanism and at least one electrical contact. The engagement mechanism may include a pushbutton and a clasp. The clasp may be configured to engage at least one of: a hook of a headpad or a hook of an earpiece when the pushbutton is not pressed. The clasp may be further configured to disengage the at least one of: the hook of the headpad or the hook of the earpiece when the pushbutton pressed.

In a further embodiment, a convertible head wearable audio device may include a headband. A first end of the headband may include a first earpiece having a speaker. A second end of the headband may include a receptacle. The convertible head wearable audio device may also include at least one microphone input. The convertible head wearable audio device may further include an active noise cancellation module. The active noise cancellation module may be configured to receive an audio input from the at least one microphone input. The audio input from the at least one microphone input may include a signal that is representative of ambient noise proximate the convertible head wearable audio device. The active noise cancellation module may be further configured to generate an audio output to the at least one speaker. The audio output having a reduce ambient noise signal component that is proportional to the signal that is representative of the ambient noise proximate the convertible head wearable audio device.

DETAIL DESCRIPTION

Head wearable audio devices are provided that may be converted from a headphone configuration to a headset configuration, and from a headset configuration to a headphone configuration. As described in detail herein, the convertible head wearable audio devices may include a headband having a first earpiece on a first end of the headband and a receptacle on a second end of the headband.

Figure 2A:
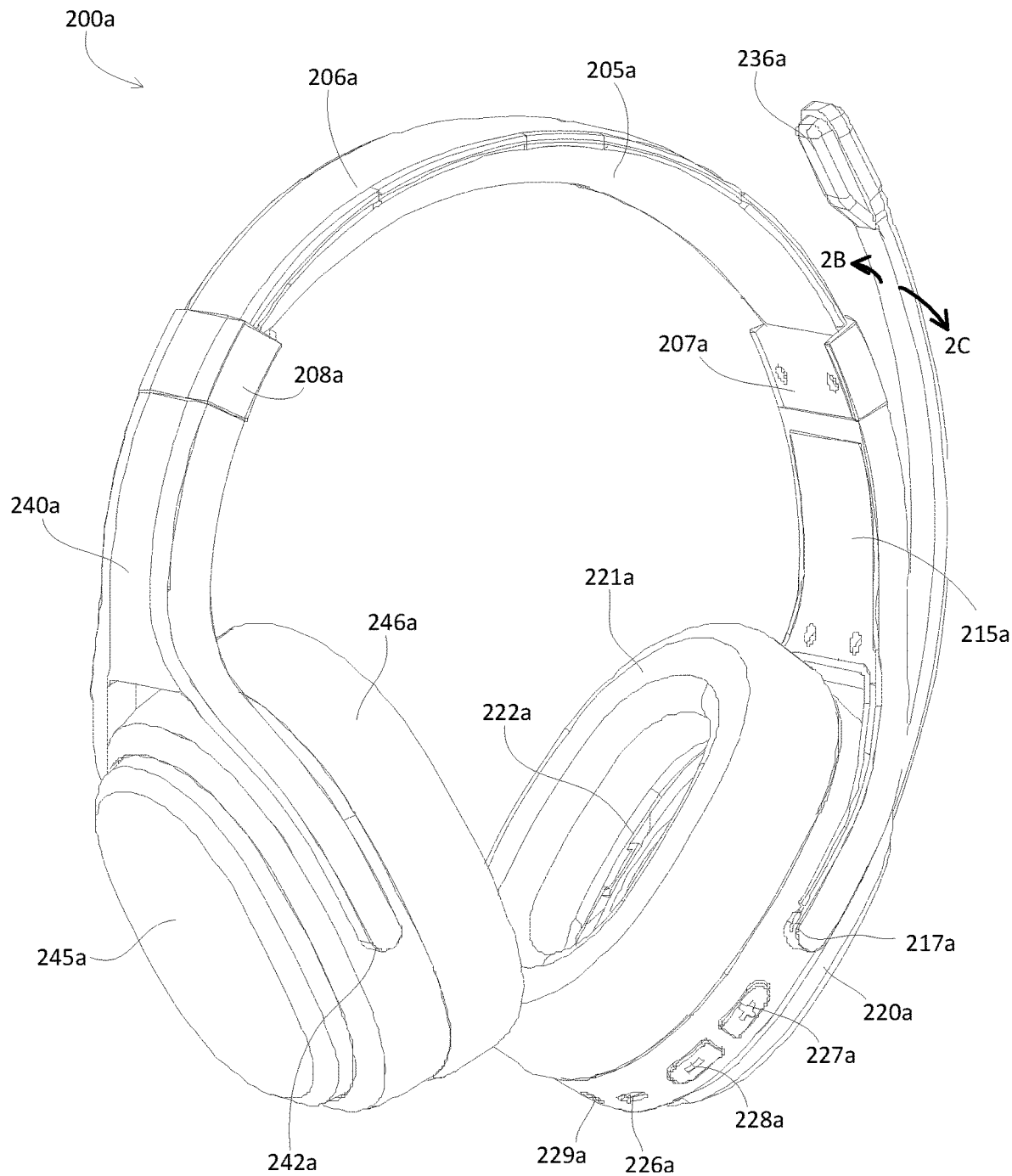
FIGS. 2A-2E depict various views of an example convertible head wearable audio device of FIG. 1A configured as a headphone.

In order to configure the convertible head wearable audio device as a dual earpiece headphone, a second earpiece may be removably secured to the receptacle of the headband (See, e.g., FIGS. 2A-D). When configured as a headphone, an associated boom mounted microphone may be pivoted to a muted orientation (e.g., a center orientation as illustrated in FIG. 2A). Details of a convertible head wearable audio device, configured as a headphone, are described herein.

Figure 2B:
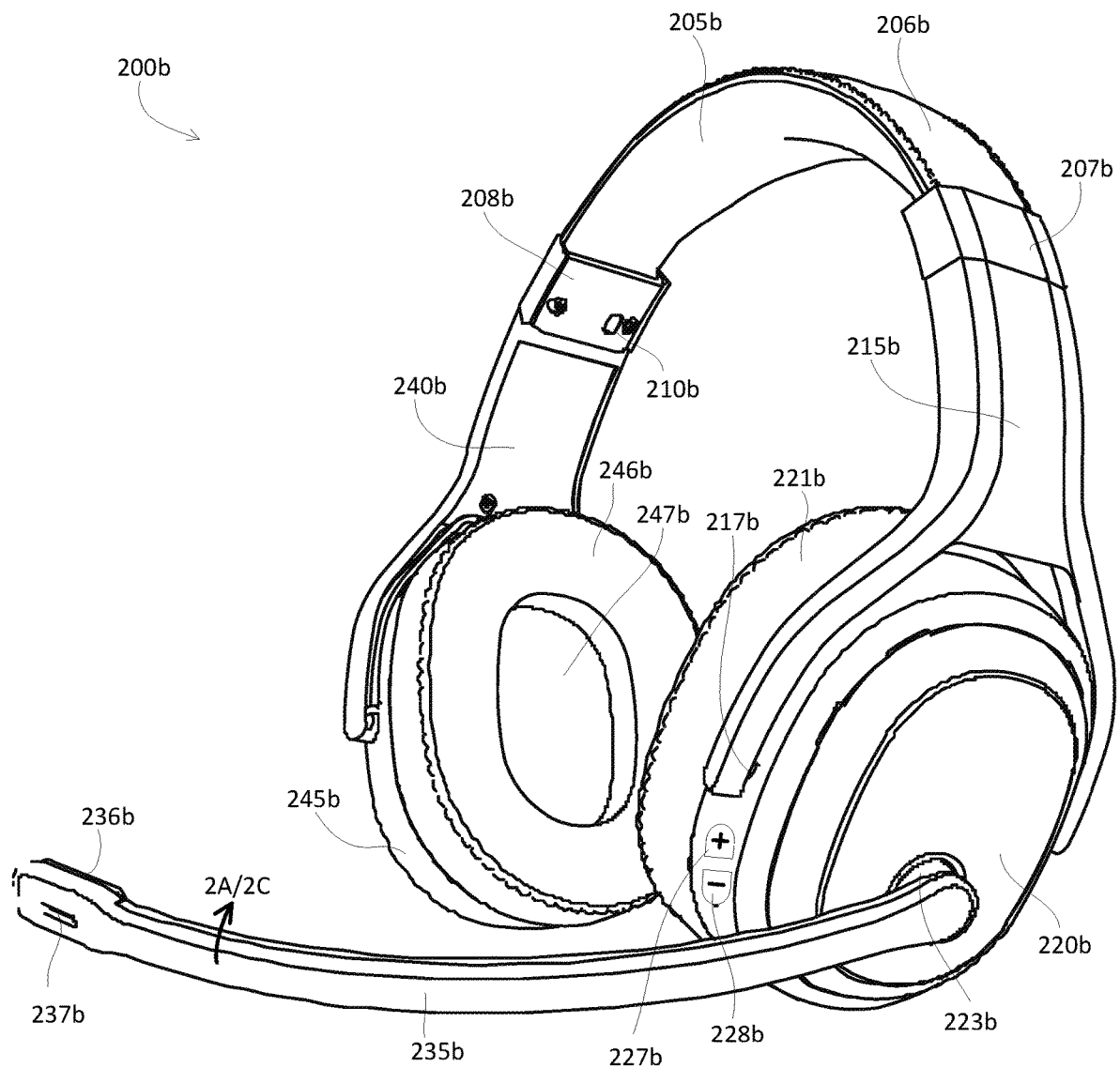
Figure 2C:
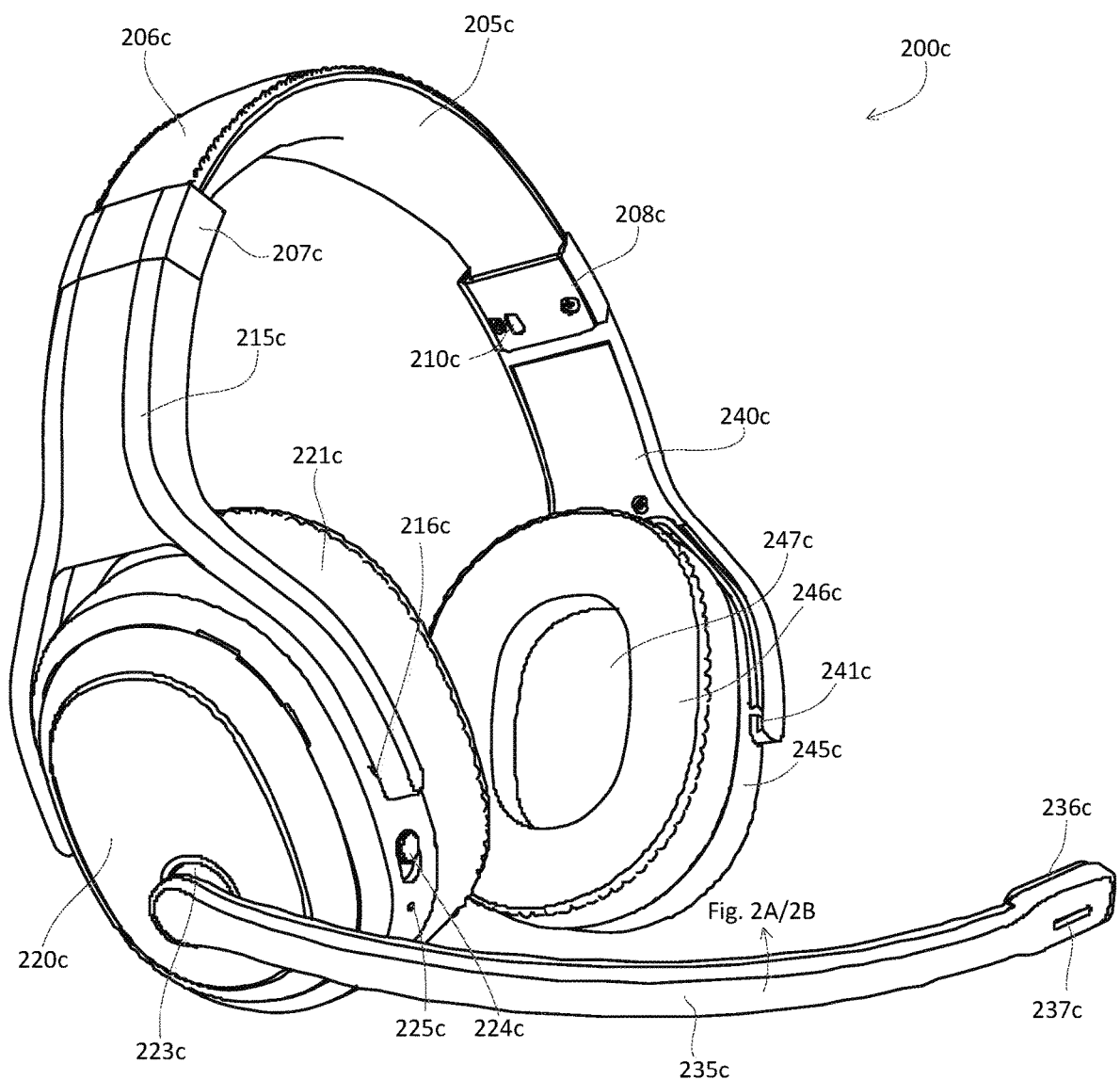
Figure 3A:
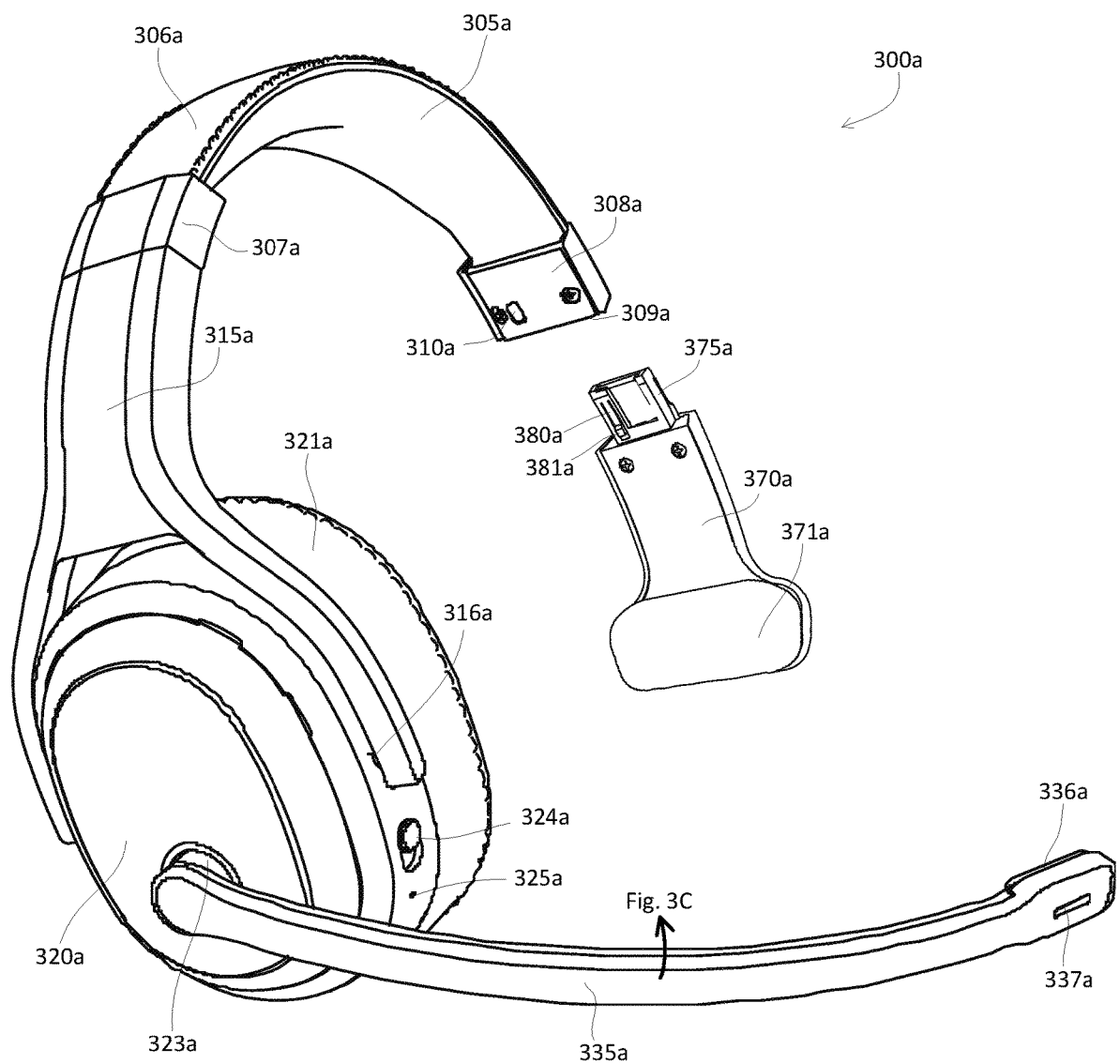
FIGS. 3A-3C depict various views of an example convertible head wearable audio device of FIG. 1A configured as a headset.
Figure 3B:
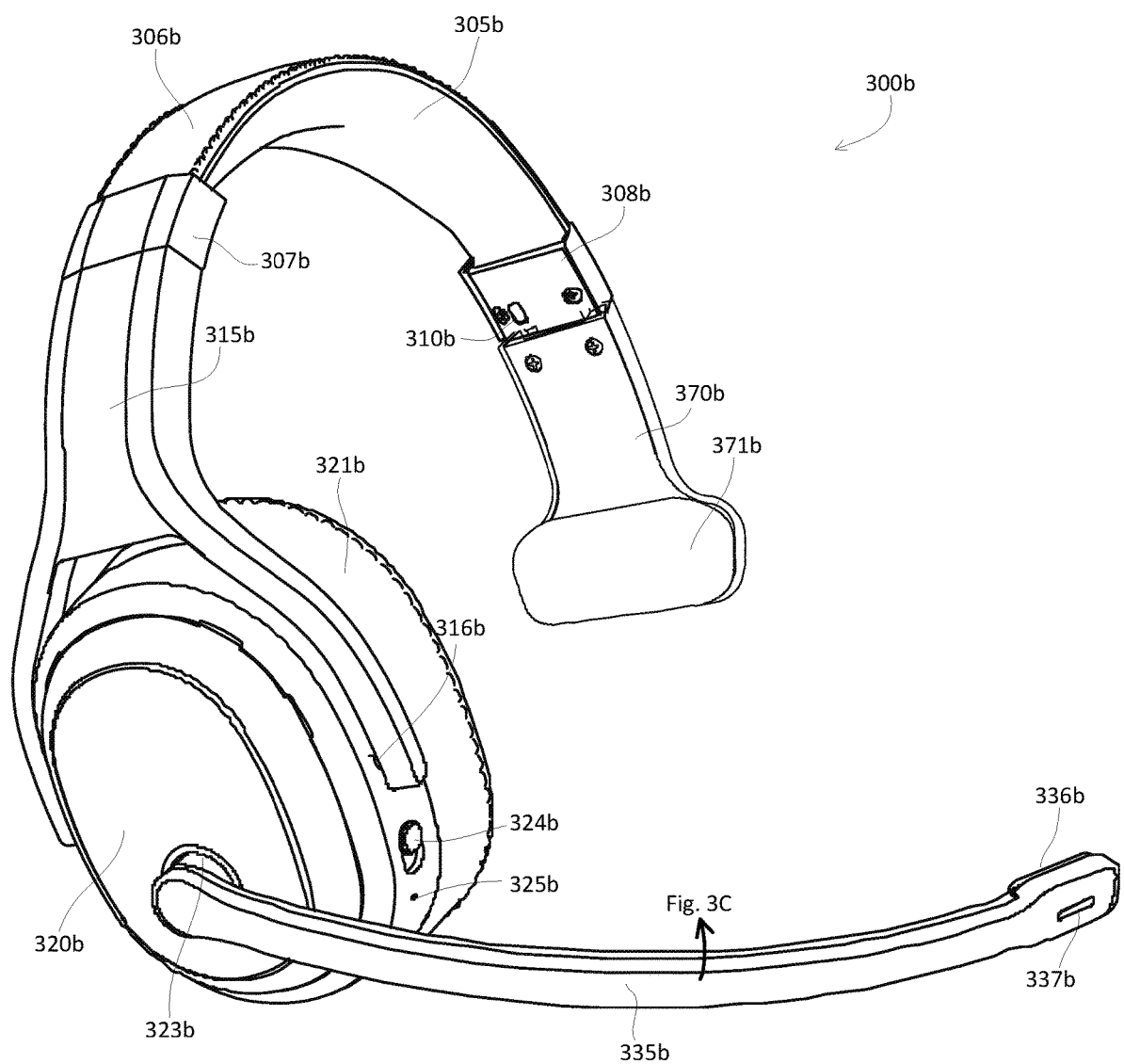
Figure 3C:
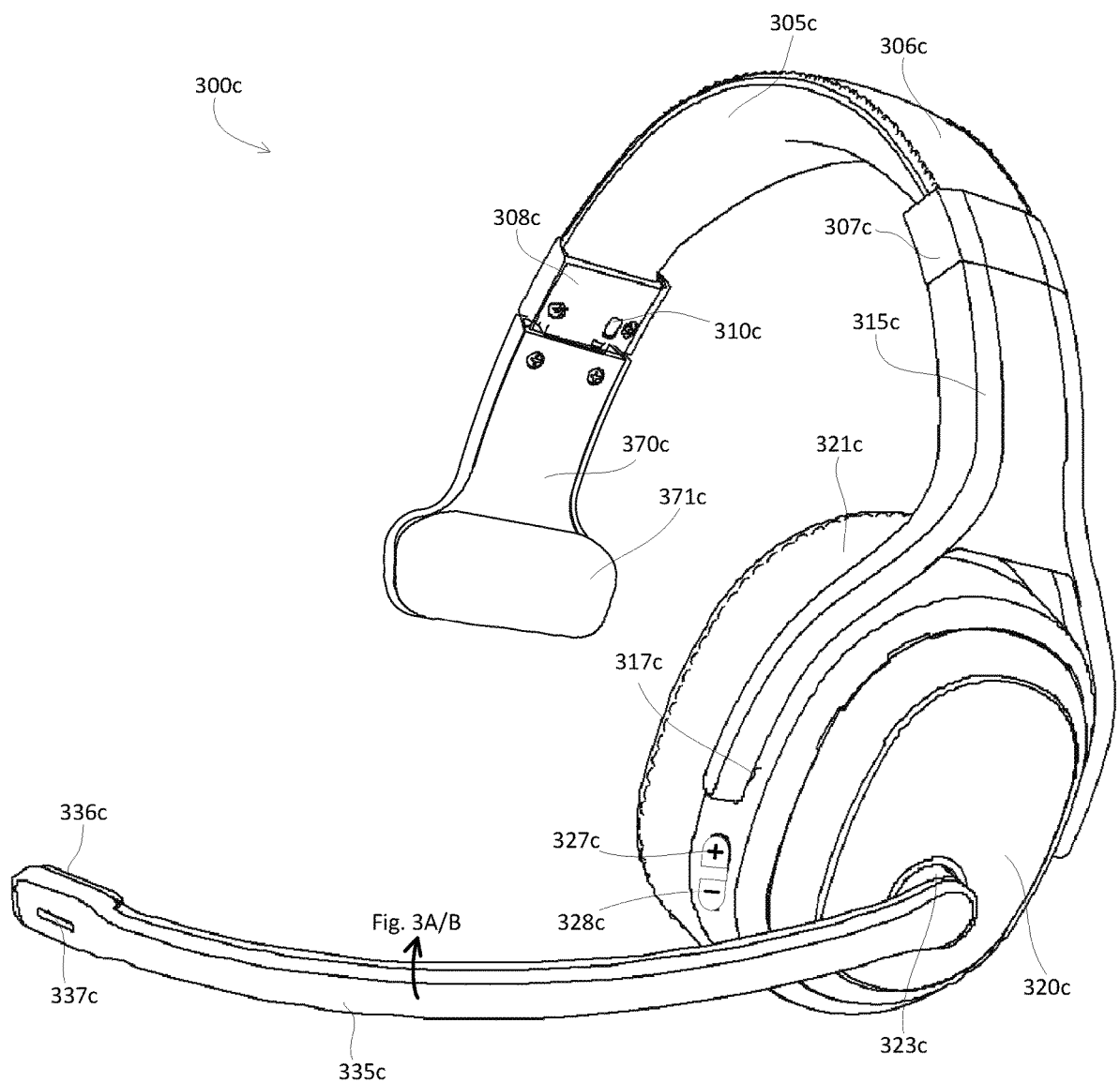

In order to configure the convertible head wearable audio device as a single earpiece headset, a headpad may be removably secured to the receptacle of the headband (See, e.g., FIGS. 3B and 3C). When configured as a headset, an associated boom mounted microphone may be pivoted to an active orientation (e.g., a left-hand orientation as illustrated in FIGS. 2B and 3C, or a right-hand orientation as illustrated in FIGS. 2C, 3A and 3B depending on, for example, a preference of a user). Details of a convertible head wearable audio device, configured as a headset, are described herein.

In addition to the above, a convertible head wearable audio device may include a wireless interface (e.g., a BLUETOOTH® interface) to communicatively couple the convertible head wearable audio device to a remote device (e.g., a cellular telephone, a vehicle communication system, a music audio source, an electronic book audio source, a lap-top computer, a desktop computer, a personal data assistant, etc.). Details of a convertible head wearable audio device having a wireless interface are described herein.

A convertible head wearable audio device may also include active noise cancellation. Thereby, the effect of ambient noise, associated with the convertible head wearable audio device, may be reduced. Accordingly, a listening experience of a user may be improved. Details of a convertible head wearable audio device having active noise cancellation are described herein.

Turning to FIGS. 1A-F, a convertible head wearable audio device 100a may include a first earpiece 115a connected to a first end 107a of a headband 105a. The headband 105a may include a receptacle 109a-f connected to a second end 108a-f. The headband 105a may include a covering 106a (e.g., a fabric cover, a leather cover, a plastic cover, a rubber cover, etc.). The first end 107a and/or the second end 108a-f may be, for example, chrome plated. In addition to the receptacle 109a-f, the second end 108a-f may include a release button 110a-f. Details of the receptacle 109a-f and the release button 110a-f are described with reference to FIGS. 1B-F. The first end 107a of a headband 105a and/or the second end 108a-f of the headband 105a may define a headband extension which may be, for example, configured to provide adjustment of a length of the headband 105a to accommodate a range of head sizes and/or head shapes.

The first earpiece 115a may include a first earpiece housing 120a pivotally attached to the first earpiece 115a via a first housing pivot 116a. The first earpiece housing 120a may also include a first circumaural portion 121a configured to, for example, extend around a first ear of a user. The first circumaural portion 121a may define, for example, a padded ear cup for user comfort and to provide an acoustic seal (e.g., an acoustic seal to retain sound generated by an associated speaker (e.g., a speaker similar to speaker 147a) within the acoustic seal and/or to limit ambient noise surrounding the acoustic seal from entering the ear of the user). The first circumaural portion 121a may include a first cover (e.g., a fabric cover, a leather cover, a plastic cover, a rubber cover, etc.).

Unwanted sound from an environment (e.g., ambient noise, vehicle engine noise, etc.) may be reduced by excluding sound from a user's ear by passive noise isolation (e.g., a circumaural portion 121a), or, often in conjunction with isolation, by active noise cancellation (e.g., as described with reference to FIG. 7). Passive noise isolation of a circumaural portion 121a may reduce ambient noise by 8 to 12 dB. Passive noise isolation of a circumaural portion 121a combined with active noise cancellation may reduce ambient noise by 25 dB.

The first earpiece housing 120a may further include an active noise cancellation on/off slider switch 124a, a status indicator 125a, and a microphone boom 135a pivotally attached to the first earpiece housing 120a via a microphone boom pivot 123a. The microphone boom pivot 123a may include a boom position sensor (e.g., boom position sensor 423 of FIG. 4). The microphone boom 135a may include a first microphone 136a. When the microphone boom 135a is oriented in an active orientation (e.g., a left-hand orientation as illustrated in FIG. 2B or a right-hand orientation as illustrated in FIG. 2C), the first microphone 136a may be, for example, oriented toward a mouth of a user such that, for example, the first microphone 136a receives sound generated by the user. The microphone boom 135a may also include a second microphone 137a. The second microphone 137a may be oriented opposite the first microphone 136a such that, for example, the second microphone receives ambient sound surrounding the convertible head wearable audio device 100a. Further details of the boom position sensor 423, the first microphone 136a, the second microphone 137a, and the active noise cancellation on/off slider switch 124a are discussed elsewhere herein.

As an addition, or as an alternative, to the microphone boom pivot 123a, a microphone boom 135a may be removably attached to the first earpiece housing 120a via, for example, a microphone boom 135a plug and a first earpiece housing 120a receptacle. As a further addition, or further alternative, a microphone boom 135a may include a flexible portion. The flexible portion may be configured such that, for example, a user may reposition the associated microphones 136a, 137a.

The convertible head wearable audio device 100a may include a detachable earpiece 140a and/or a detachable headpad 170a. The detachable earpiece 140a may include a second earpiece housing 145a pivotally attached to the detachable earpiece 140a via a second housing pivot 141a. The second earpiece housing 145a may also include a second circumaural portion 146a configured to, for example, extend around a second ear of a user. The second circumaural portion 146a may define, for example, a padded ear cup for user comfort and to provide an acoustic seal (e.g., an acoustic seal to retain sound generated by an associated speaker 147a within the acoustic seal and/or to limit ambient noise surrounding the acoustic seal from entering the ear of the user). The second circumaural portion 146a may include a second cover (e.g., a fabric cover, a leather cover, a plastic cover, a rubber cover, etc.).

The detachable earpiece 140a may further include an earpiece plug 150a configured to be received within the receptacle 109a. The clasp 156a hingedly attached to the earpiece plug 150a via, for example, a flexible hinge 155a. Further details of the earpiece plug 150a, the receptacle 109a, and the clasp 156a will be described with regard to FIGS. 1B-F. In any event, the earpiece plug 150a may include a first electrical contact 151a, a second electrical contact 152a, a third electrical contact 153a, and a fourth electrical contact 154a. The first electrical contact 151a may be configured as, for example, a microphone positive contact. The second electrical contact 152a may be configured as, for example, a microphone negative contact. The microphone positive contact 151a and the microphone negative contact 152a may, for example, provide a microphone voltage at a common collector ($V_{cc}$) to a microphone. The third electrical contact 153a may be configured as, for example, a speaker positive contact. The fourth electrical contact 154a may be configured as, for example, a speaker negative contact. While not shown in FIGS. 1A-F, the receptacle 109a may include first, second, third, and fourth electrical contacts configured to, for example, electrically connect the first electrical contact 151a, the second electrical contact 152a, the third electrical contact 153a, and the fourth electrical contact 154a, respectively, to the convertible head wearable audio device 100a. Further details of the electrical connections are described herein with reference to FIG. 4.

The detachable headpad 170a may include a padded portion 171a. The padded portion 171a may be configured to, for example, rest against a head of a user when an associated headset is in use. The padded portion 171a may include a cover (e.g., a fabric cover, a leather cover, a plastic cover, a rubber cover, etc.). The detachable headpad 170a may also include headpad plug 175a configured to be received within the receptacle 109a. The headpad plug 175a may include a clasp 181a hingedly attached to the headpad plug 175a via, for example, a flexible hinge 180a. Further details of the headpad plug 175a, the receptacle 109a, and the clasp 181a will be described with regard to FIGS. 1B-F.

With additional reference to FIGS. 1B-1F, an engagement mechanism 100a-f may include a receptacle 109b-f of a headband end 108a-f and a plug 175b-f. The receptacle 109b-f may be similar to, for example, the receptacle 109a of FIG. 1A. The plug 175b-f may be similar to, for example, either the plug 175a or portions of the plug 150a of FIG. 1A. The receptacle 109b-f may include a release pushbutton 110b-f, a release arm 111b,c,f, and a hook portion 114b-f with a perpendicular surface 112b,e and a sloped surface 113b,c. The plug 175b-f may include a clasp 181b-f hingedly connected to the plug 175b-f via, for example, a flexible hinge 180b. The clasp 181b-f may include a sloped surface 176b,c and a perpendicular surface 177b.

Figure 1A:
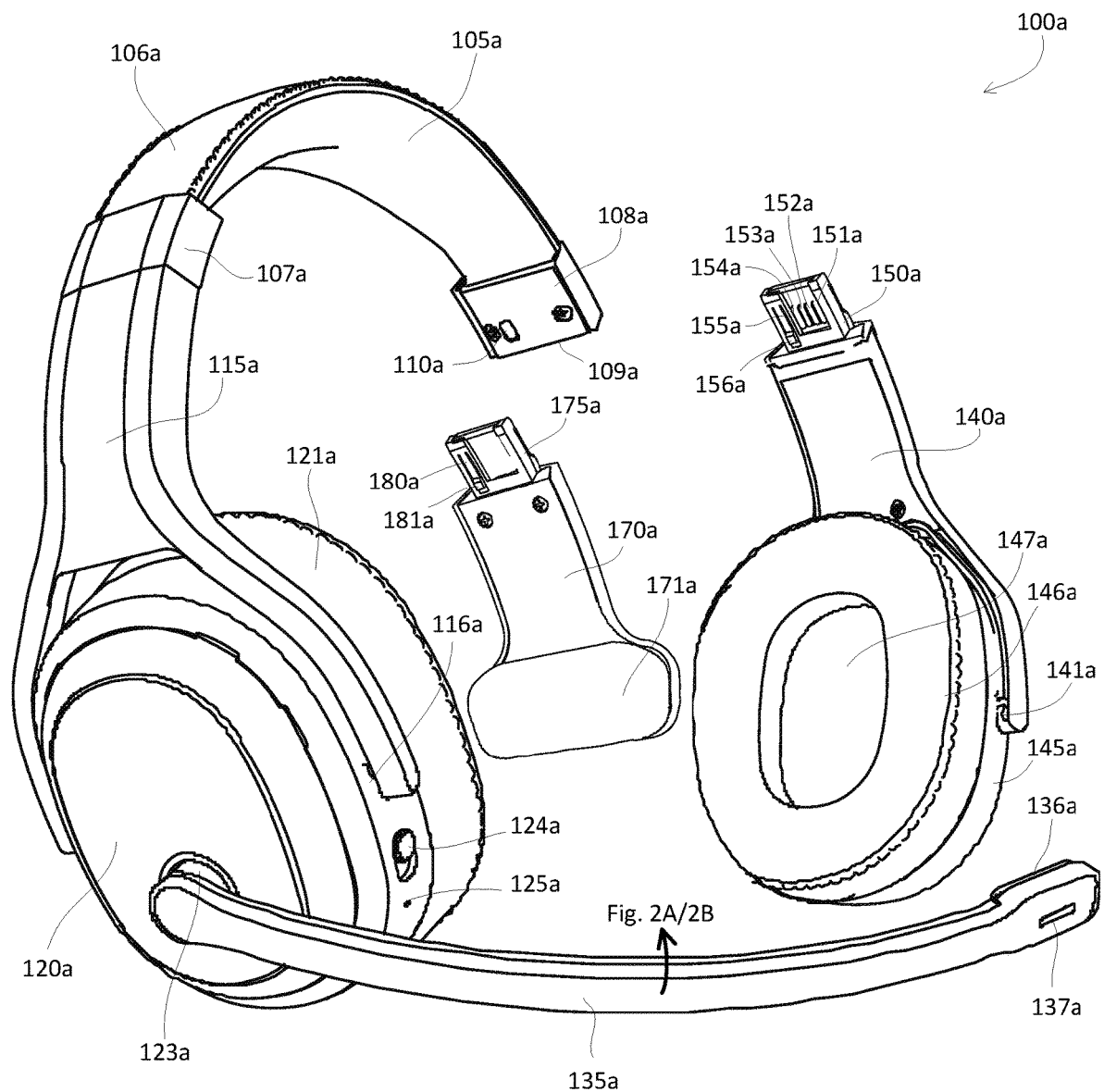
FIG. 1A depicts an example convertible head wearable audio device with a detachable earpiece and a detachable headpad.
Figure 1B:
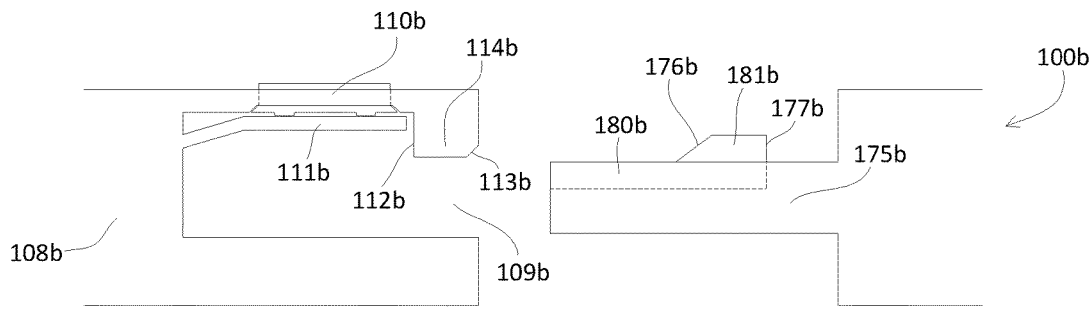
FIGS. 1B-1F depict various views of an example engagement mechanism for removably securing a detachable earpiece or a detachable headpad to a convertible head wearable audio device of FIG. 1A.
Figure 1C:
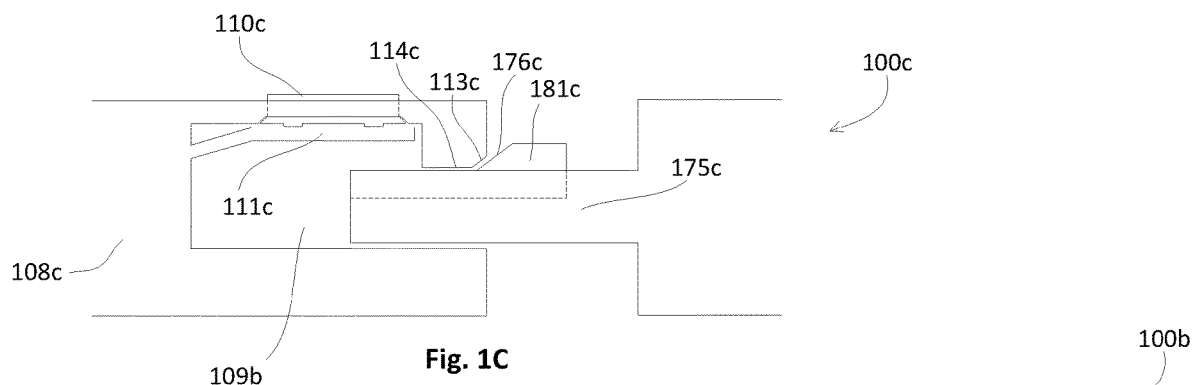
Figure 1D:
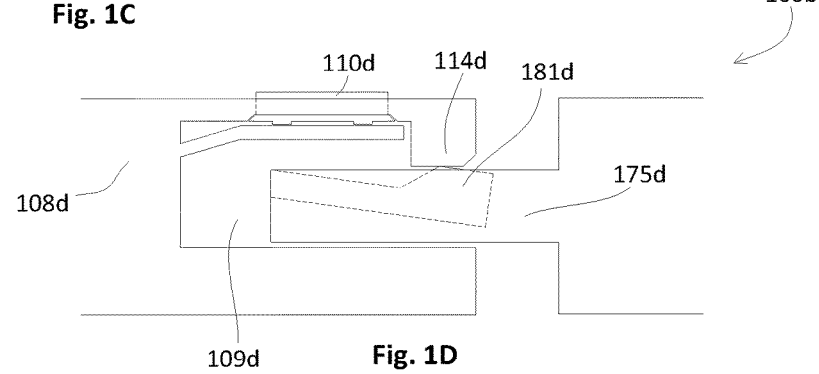
Figure 1E:
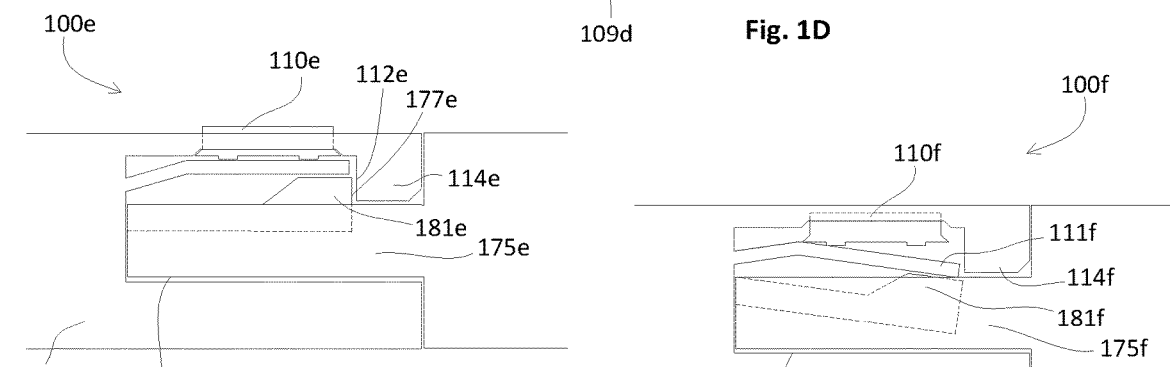
Figure 1F:
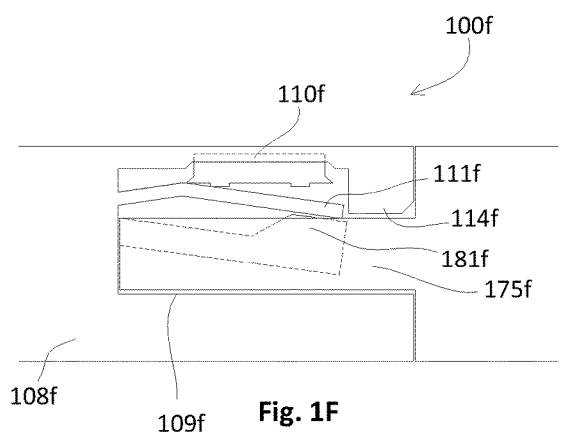

In any event, the engagement mechanism 100b-f may be configured to, for example, removably secure a detachable earpiece 140a or a detachable headpad 170a to a convertible head wearable audio device 100a of FIG. 1A. With further reference to FIG. 1B, the plug 175b is removed from the receptacle 109b (i.e., neither a detachable earpiece 140a nor a detachable earpad 170a is connected to the convertible head wearable audio device 100a). As illustrated with further reference to FIG. 1C, when a user inserts a portion of the plug 175c into the receptacle 109c, the sloped surface 176c of the clasp 181c engages the sloped surface 113c of the hook 114c. As illustrated with further reference to FIG. 1D, when the user inserts the plug 175d further into the receptacle 109d with respect to FIG. 1C, the clasp 181d is caused to hinge such that the clasp 181d slides along the hook 114d. As illustrated with further reference to FIG. 1E, once the plug 175e is fully inserted within the receptacle 109e, the clasp 181e returns to an unhinged orientation such that the perpendicular surface 177e of the clasp 181e is proximate the perpendicular surface 112e of the hook 114e (i.e., the clasp 181e engages the hook 114e such that the plug 175e is secured within the receptacle 109e). As illustrated with further reference to FIG. 1F, when a user wants to remove the plug 175f from the receptacle 109f, the user presses on the release pushbutton 110f causing the release arm 111f to hinge the clasp 181f such that the clasp 181f is free to slide with respect to the hook 114f (i.e., the user may remove the plug 175f from the receptacle 1090.

While the receptacle 109a-f may be connected to the headband 108a-f, the plug 175a-f may be connected to the detachable headpad 170a, and the plug 150a may be connected to the detachable earpiece 140a as illustrated in FIGS. 1A-F, a receptacle 109a-f may be connected to the detachable headpad 170a and the detachable earpiece 140a, and a mating plug 150a, 175a-f may be connected to the headband 108a-f. Alternatively, a convertible head wearable audio device 100a may include other forms of an engagement mechanism 100b-f to detachably connect a detachable headpad 170a and/or a detachable earpiece 140a to a headband 108a.

With reference to FIGS. 2A-2E, a convertible head wearable audio device 200a-e may be similar to, for example, the convertible head wearable audio device 100a of FIG. 1A. However, as illustrated in FIGS. 2A-D, the convertible head wearable audio device 200a-d is configured as a dual earpiece headphone. The convertible head wearable audio device 100a may include a first earpiece 215a-e connected to a first end 207a-d of a headband 205a-d. The headband 205a-e may include a receptacle 209e connected to a second end 208e. The headband 205a-e may include a covering 206a-e (e.g., a fabric cover, a leather cover, a plastic cover, a rubber cover, etc.). The first end 207a-e and/or the second end 208a-e may be, for example, chrome plated. In addition to the receptacle 209e, the second end 208a-e may include a release button 210a-e. Details of the receptacle 209e and the release button 210a-e may be similar to, for example, the receptacle 109a-f and the release button 110a-f which are described with reference to FIGS. 1B-F. The first end 207a-e of a headband 205a-e and/or the second end 208a-e of the headband 205a-e may define a headband extension which may be, for example, configured to provide adjustment of a length of the headband 205a-e to accommodate a range of head sizes and/or head shapes.

The first earpiece 215a-e may include a first earpiece housing 220a-e pivotally attached to the first earpiece 215a-e via a first housing pivot 216c-e/217a,d. The first earpiece housing 220a-e may also include a first circumaural portion 221a-e configured to, for example, extend around a first ear of a user. The first circumaural portion 221a-e may define, for example, a padded ear cup for user comfort and to provide an acoustic seal (e.g., an acoustic seal to retain sound generated by an associated speaker 222a within the acoustic seal and/or to limit ambient noise surrounding the acoustic seal from entering the ear of the user). The first circumaural portion 221a-e may include a first cover (e.g., a fabric cover, a leather cover, a plastic cover, a rubber cover, etc.).

The first earpiece housing 220a-e may further include an active noise cancellation on/off slider switch 224c-e, a status indicator 225b-e, a universal serial bus connecter 226a,d (e.g., a micro USB connector), a volume increase pushbutton 227a-c, a volume decrease pushbutton 228a-c, an audio input connector 229a,d (e.g., a 3.5 mm audio input), a multi-function pushbutton 230d, and a microphone boom 235a-e pivotally attached to the first earpiece housing 220a-e via a microphone boom pivot 223b-e. The microphone boom pivot 223b-e may include a boom position sensor (e.g., boom position sensor 423 of FIG. 4). The microphone boom 235a-e may include a first microphone 236a-c,e. When the microphone boom 235a-e is oriented in an active orientation (e.g., a left-hand orientation as illustrated in FIG. 2B or a right-hand orientation as illustrated in FIGS. 2C and 2E), the first microphone 236a-c,e may be, for example, oriented toward a mouth of a user such that, for example, the first microphone 236a-c,e receives sound generated by the user. The microphone boom 235a-e may also include a second microphone 237b,c,e. The second microphone 237b,c,e may be oriented opposite the first microphone 236a-c,e such that, for example, the second microphone receives ambient sound surrounding the convertible head wearable audio device 200a-e. Further details of the boom position sensor 423, the first microphone 236a-c,e, the second microphone 237b,c,e, and the active noise cancellation on/off slider switch 224c-e are discussed elsewhere herein.

The convertible head wearable audio device 200a-e may include a detachable earpiece 240a-e. The detachable earpiece 240a-e may include a second earpiece housing 245a-e pivotally attached to the detachable earpiece 240a-e via a second housing pivot 241c-e/242a,b,d. The second earpiece housing 245a-e may also include a second circumaural portion 246a-e configured to, for example, extend around a second ear of a user. The second circumaural portion 246a-e may define, for example, a padded ear cup for user comfort and to provide an acoustic seal (e.g., an acoustic seal to retain sound generated by an associated speaker 247b,c,e within the acoustic seal and/or to limit ambient noise surrounding the acoustic seal from entering the ear of the user). The second circumaural portion 246a-e may include a second cover (e.g., a fabric cover, a leather cover, a plastic cover, a rubber cover, etc.).

The detachable earpiece 240a-e may further include an earpiece plug 250e configured to be received within the receptacle 209e. The clasp 256e may be flexibly attached to the earpiece plug 250e via, for example, a flexible hinge 255e. Further details of the earpiece plug 250e, the receptacle 209e, and the clasp 256e may be similar to, for example, the earpiece plug 150a, the receptacle 109a, and the clasp 156a which are described with regard to FIGS. 1B-F. In any event, the earpiece plug 250e may include a first electrical contact 251e, a second electrical contact 252e, a third electrical contact 253e, and a fourth electrical contact 254e. The first electrical contact 251e may be configured as, for example, a microphone positive contact. The second electrical contact 252e may be configured as, for example, a microphone negative contact. The microphone positive contact 251e and the microphone negative contact 252e may, for example, provide a microphone voltage at a common collector ($V_{cc}$) to a microphone. The third electrical contact 253e may be configured as, for example, a speaker positive contact. The fourth electrical contact 254e may be configured as, for example, a speaker negative contact. While not shown in FIG. 2E, the receptacle 209e may include first, second, third, and fourth electrical contacts configured to, for example, electrically connect the first electrical contact 251e, the second electrical contact 252e, the third electrical contact 253e, and the fourth electrical contact 254e, respectively, to the convertible head wearable audio device 200a-e. Further details of these electrical connections are described herein with reference to FIG. 4.

Figure 2D:
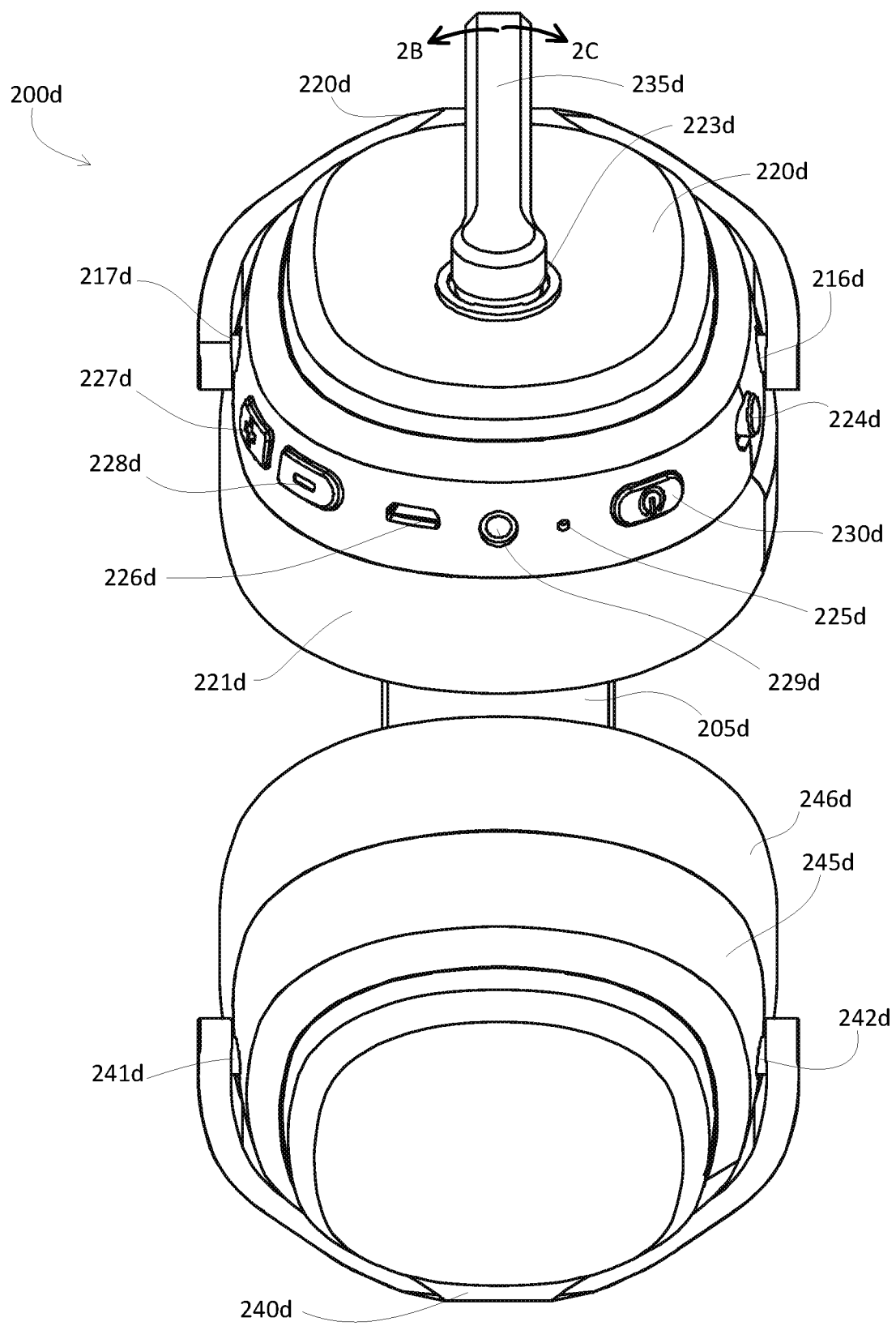
Figure 2E:
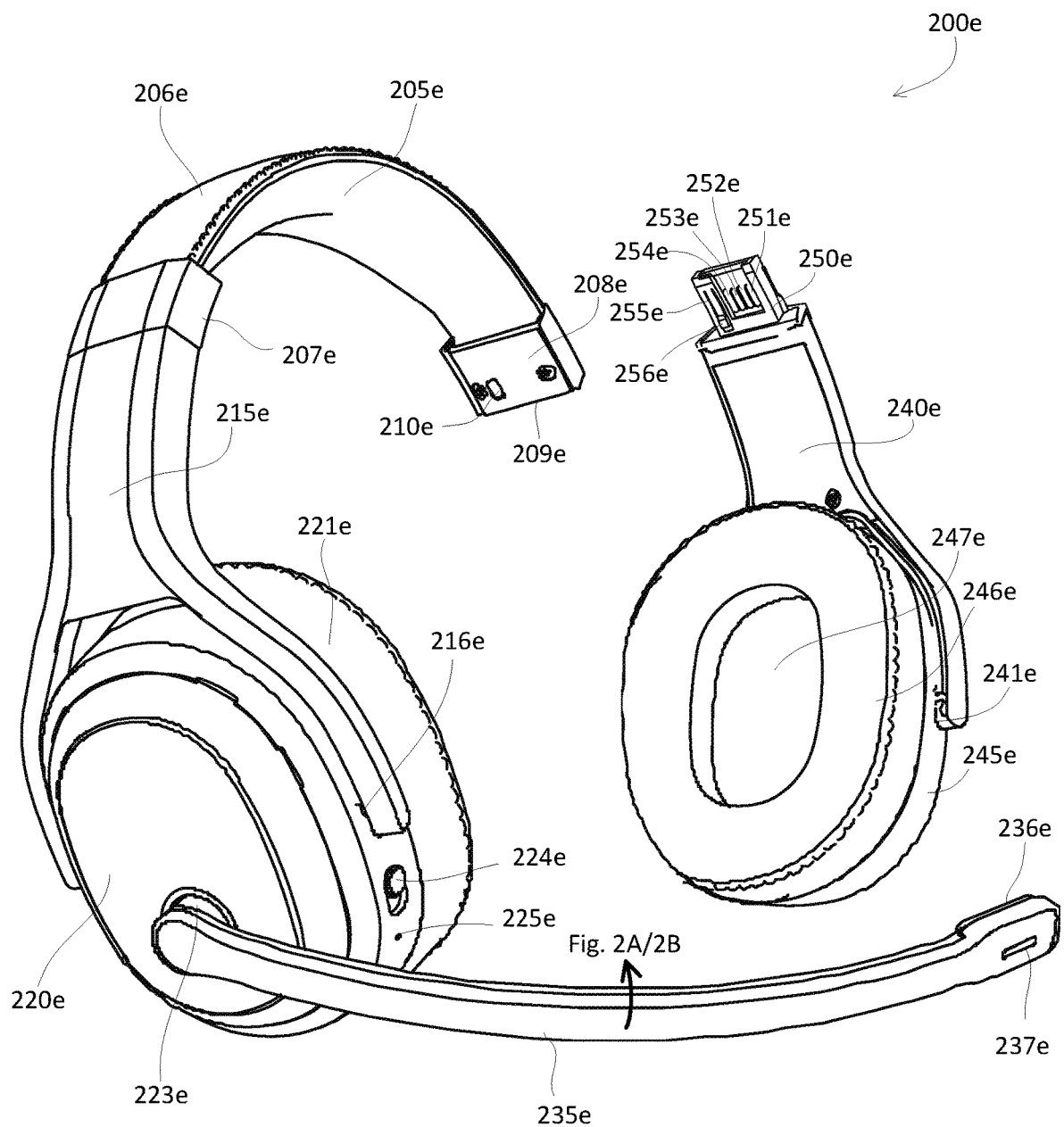

As illustrated in FIGS. 2A and 2D, the microphone boom 235a,d is oriented in a muted orientation. As described in detail elsewhere herein, when the microphone boom 235a,d is oriented in a muted orientation as illustrated in FIGS. 2A and 2D, an input signal from the microphone 236a-c,e and/or the microphone 237b,c,e may be muted. A user may orient the microphone boom 235a,d in a muted orientation as illustrated in FIGS. 2A and 2D when, for example, the user does not want to use a talk feature. As illustrated in FIG. 2B, the microphone boom 235b is oriented in an active orientation (i.e., a left-hand orientation). As illustrated in FIGS. 2C and 2E, the microphone boom 235c,e is oriented in an active orientation (i.e., a right-hand orientation). A user may orient the microphone boom 235b,c,e in an active orientation as illustrated in FIGS. 2B, 2C and 2E when, for example, the user wants to use a talk feature (e.g., a user wants to use hands-free telephone functionality).

Turning to FIGS. 3A-3C, a convertible head wearable audio device 300a-c may be similar to, for example, the convertible head wearable audio device 100a of FIG. 1A. As illustrated in FIGS. 3B and 3C, the convertible head wearable audio device 300b,c is configured as a headset. In any event, the convertible head wearable audio device 300a-c may include a first earpiece 315a-c connected to a first end 307a-c of a headband 305a-c. The headband 305a may include a receptacle 309a connected to a second end 308a. The headband 305a-c may include a covering 306a-c (e.g., a fabric cover, a leather cover, a plastic cover, a rubber cover, etc.). The first end 307a-c and/or the second end 308a-c may be, for example, chrome plated. In addition to the receptacle 309a, the second end 308a-c may include a release pushbutton 310a-c. Details of the receptacle 309a and the release button 310a-c may be similar to, for example, the receptacle 109a-f and the release button 110a-f which are described with reference to FIGS. 1B-F. The first end 307a-c of a headband 305a-c and/or the second end 308a-c of the headband 305a-c may define a headband extension which may be, for example, configured to provide adjustment of a length of the headband 305a-c to accommodate a range of head sizes and/or head shapes.

The first earpiece 315a-c may include a first earpiece housing 320a-c pivotally attached to the first earpiece 315a-c via a first housing pivot 316a,b/317c. The first earpiece housing 320a-c may also include a first circumaural portion 321a-c configured to, for example, extend around a first ear of a user. The first circumaural portion 321a-c may define, for example, a padded ear cup for user comfort and to provide an acoustic seal (e.g., an acoustic seal to retain sound generated by an associated speaker (e.g., a speaker similar to speaker 222a) within the acoustic seal and/or to limit ambient noise surrounding the acoustic seal from entering the ear of the user). The first circumaural portion 321a-c may include a first cover (e.g., a fabric cover, a leather cover, a plastic cover, a rubber cover, etc.).

The first earpiece housing 320a-c may further include an active noise cancellation on/off slider switch 324a,b, a status indicator 325a,b, a universal serial bus connecter (not shown in FIGS. 3A-C), a volume increase pushbutton 327c, a volume decrease pushbutton 328c, an audio input connector 329c (e.g., a 3.5 mm audio input), a multi-function pushbutton (not shown in FIGS. 3A-C), and a microphone boom 335a-c pivotally attached to the first earpiece housing 320a-c via a microphone boom pivot 323a-c. The microphone boom pivot 323a-c may include a boom position sensor (e.g., boom position sensor 423 of FIG. 4). The microphone boom 335a-c may include a first microphone 336a-c. When the microphone boom 335a-c is oriented in an active orientation (e.g., a right-hand orientation as illustrated in FIGS. 3A and 3B or a left-hand orientation as illustrated in FIG. 3C), the first microphone 336a-c may be, for example, oriented toward a mouth of a user such that, for example, the first microphone 336a-c receives sound generated by the user. The microphone boom 335a-c may also include a second microphone 337a-c. The second microphone 337a-c may be oriented opposite the first microphone 336a-c such that, for example, the second microphone 337a-c may receive ambient sound surrounding the convertible head wearable audio device 300a-c. Further details of the boom position sensor 423, the first microphone 336a-c, the second microphone 337a-c, and the active noise cancellation on/off slider switch 324a,b are discussed elsewhere herein.

The convertible head wearable audio device 300a-c may include a detachable headpad 370a-c. The detachable headpad 370a-c may include a padded portion 371a-c. The padded portion 371a-c may be configured to, for example, rest against a head of a user when an associated headset is in use. The padded portion 371a-c may include a cover (e.g., a fabric cover, a leather cover, a plastic cover, a rubber cover, etc.). The detachable headpad 370a-c may also include headpad plug 375a configured to be received within the receptacle 309a. The headpad plug 375a may include a clasp 381a hingedly attached to the headpad plug 375a via, for example, a flexible hinge 380a. Further details of the headpad plug 375a, the receptacle 309a, and the clasp 381a may be similar to, for example, the headpad plug 175a, the receptacle 109a, and the clasp 181a which are described with regard to FIGS. 1B-F.

As illustrated in FIGS. 3A and 3B, the microphone boom 335a,b is oriented in an active orientation (i.e., a right-hand orientation). As illustrated in FIG. 3C, the microphone boom 335c is oriented in an active orientation (i.e., a left-hand orientation). A user may orient the microphone boom 335a-c in an active orientation as illustrated in FIGS. 3A-C when, for example, the user wants to use a talk feature (e.g., a user wants to use hands-free telephone functionality).

Figure 4:
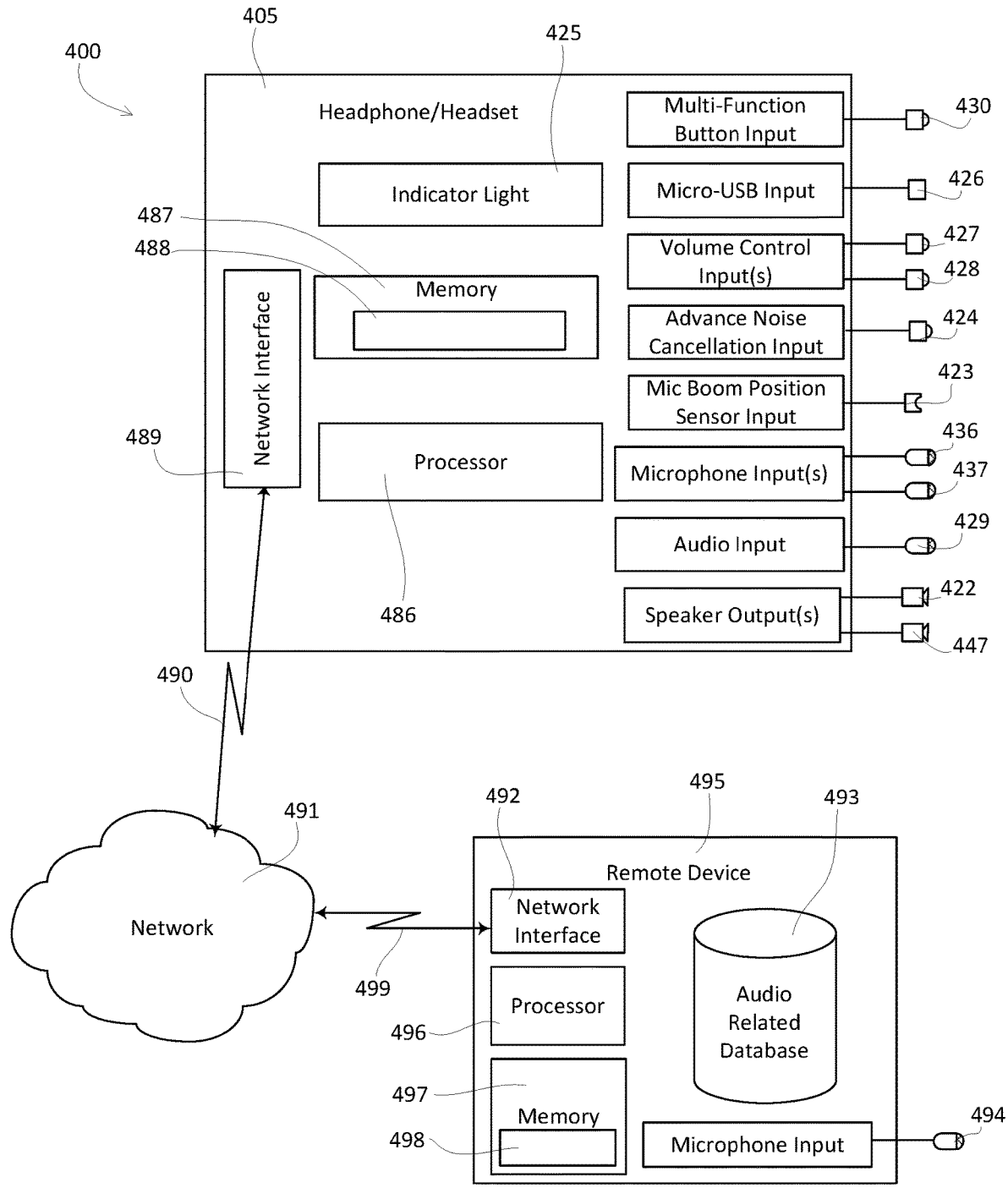
FIG. 4 depicts an example high level block diagram of a convertible head wearable audio device wireless communication system.

With reference to FIG. 4, a convertible head wearable audio device communication system 400 may include a convertible head wearable audio device 405 communicatively coupled to a remote device 495 (e.g., a cellular telephone, a vehicle communication system, a music source, an electronic book source, etc.) via a communication network 491. The convertible head wearable audio device 405 may be similar to, for example, the convertible head wearable audio device 100a of FIG. 1A, the headphone 200a-d of FIGS. 2A-E, or the headset of FIGS. 3B and 3C. For clarity, only one convertible head wearable audio device 405 is depicted in FIG. 4. While FIG. 4 depicts only one convertible head wearable audio device 405, it should be understood that any number of convertible head wearable audio devices 405 may be supported.

The convertible head wearable audio device 405 may include a user interface 425 (e.g., a battery charging indicator, a convertible head wearable audio device 405 pairing status indicator, etc.). The user interface 425 may be, for example, a single multi-function indicating light, a touch screen display, etc. The convertible head wearable audio device 405 may also include a convertible head wearable audio device 405 power on/off input 430, a universal serial bus input/output 426 (e.g., a micro USB input/output), convertible head wearable audio device 405 volume control inputs 427, 428, an active noise cancellation on/off input 424, a microphone boom position sensor input 423, microphone inputs 436, 437, an audio input 429, and speaker outputs 422, 447.

The convertible head wearable audio device 405 may further include a memory 487 and a processor 486 for storing and executing, respectively, a module 488. The module 488, stored in the memory 487 as a set of computer-readable instructions, may be related to, for example, a convertible head wearable audio device 405 operation application that, when executed on the processor 486, causes processor 486 to operate the convertible head wearable audio device 405 (e.g., pair the convertible head wearable audio device 405 with a remote device 495, receive audio inputs, perform active noise cancellation, generate audio outputs, transmit audio outputs, etc.). Operation of the convertible head wearable audio device 405 is described in more detail with reference to FIGS. 5-7. Execution of the module 488 may further cause the processor 486 to communicate with the processor 496 of the remote computing device 495 via the convertible head wearable device 405 network interface 489, the convertible head wearable audio device 405 network connection 490, the communication network 491, the remote device 495 network connection 499, and the remote device 495 network interface 492.

The convertible head wearable audio device 405 network interface 489 may be configured to facilitate communications between the convertible head wearable audio device 405 and the remote device 495 via any hardwired or wireless communication network 415, including for example a wireless LAN, MAN or WAN, WiFi, the Internet, a Bluetooth connection, a cellular telephone network, or any combination thereof. Moreover, the convertible head wearable audio device 405 may be communicatively connected to the remote computing device 495 via any suitable communication system, such as via any publicly available or privately owned communication network, including those that use wireless communication structures, such as wireless communication networks, including for example, wireless LANs and WANs, satellite and cellular telephone communication systems, etc.

The remote device 495 may include a memory 497 and a processor 496 for storing and executing, respectively, a module 498. The module 498, stored in the memory 497 as a set of computer-readable instructions, may facilitates applications related to operation of the convertible head wearable audio device 405 (e.g., pair the convertible head wearable audio device 405 with the remote device 495, receive audio inputs, perform active noise cancellation, generate audio outputs, transmit audio outputs, etc.). The remote device 495 may include at least one microphone input 494. While not shown in FIG. 4, the remote device 495 may also include a user interface (e.g., a touch screen display, a display/keyboard, etc.). Operation of the remote device 495 is described in more detail with reference to FIGS. 5-7. The module 498 may also facilitate communications between the remote device 495 and the convertible head wearable audio device 405 via a remote device 495 network interface 492, a remote device network connection 499, the communication network 491, the convertible head wearable audio device 405 network connection 490, and the convertible head wearable audio device 405 network interface 489.

The remote device 495 may be communicatively coupled to audio related database 493 (e.g., a music database, an electronic book database, a cellular telephone communications database, a vehicle related database, etc.). While the audio related database 493 is shown in FIG. 4 as being communicatively coupled to the remote device 495, it should be understood that the audio related database 493 may be located within separate remote servers (or any other suitable computing devices) communicatively coupled to the remote device 493. Optionally, portions of audio database 493 may be associated with memory modules that are separate from one another, such as a memory 487 of the convertible head wearable audio device 405.

Figure 5:
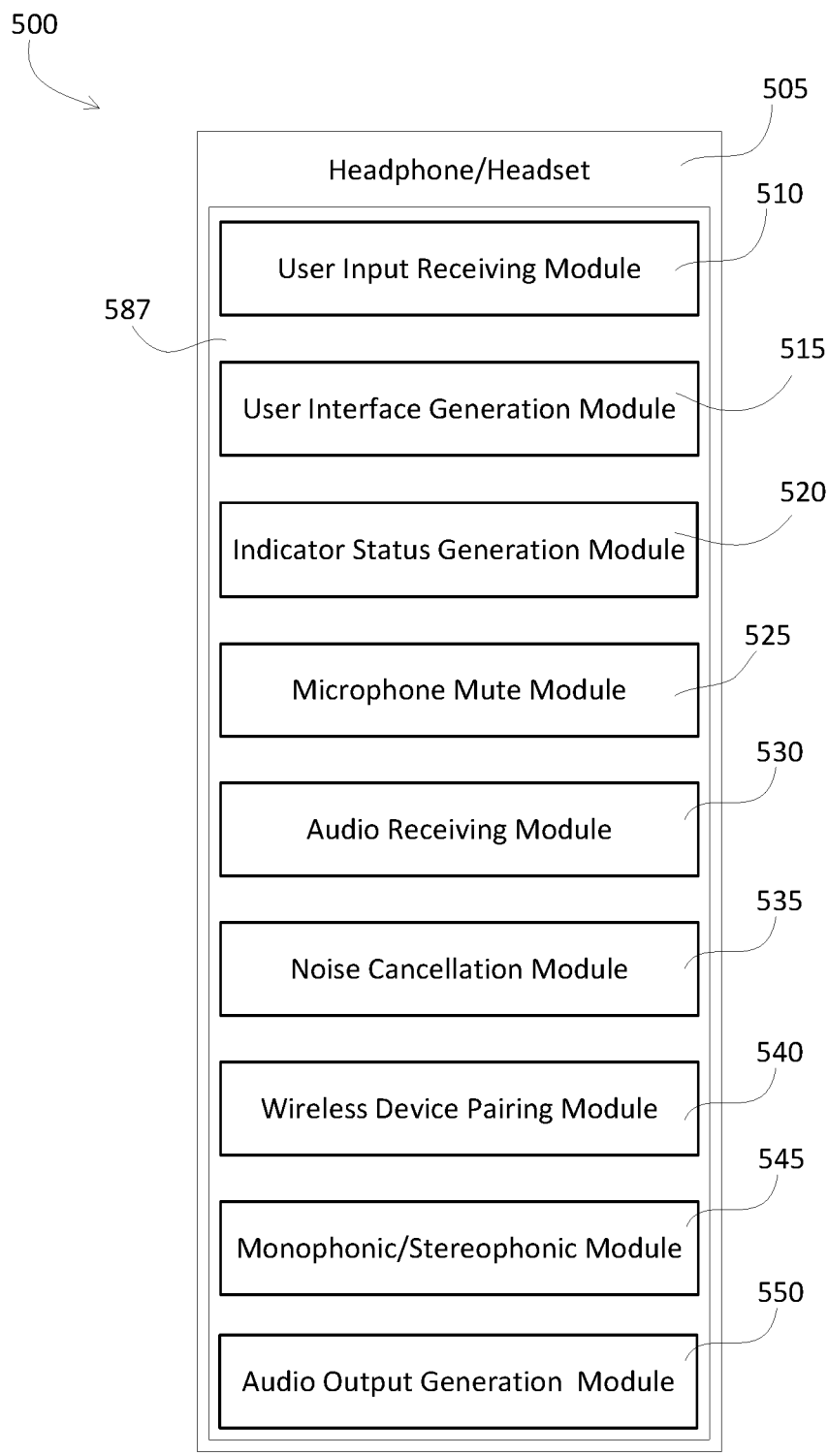
FIG. 5 depicts an example block diagram of a convertible head wearable audio device.

Turning to FIG. 5, a convertible head wearable audio device 500 may include a memory 587. The convertible head wearable audio device 505 may be similar to, for example, the convertible head wearable audio device 405 of FIG. 4. The memory 587 may be similar to, for example, the memory 487. The convertible head wearable audio device 500 may include a user input receiving module 510, a user interface generation module 515, an indicator status generation module 520, a microphone mute module 525, an audio receiving module 530, a noise cancellation module 535, a wireless device pairing module 540, a monophonic/stereophonic module 545, and an audio output module 550. The modules 510-550 may be similar to, for example, modules 488, 498 of FIG. 4. The modules 510-550 may be stored on the memory 587, as a set of computer-readable instructions, that, when executed by a processor (e.g., processor 486 of FIG. 4) may cause the processor 486 to operate the convertible head wearable audio device 500 (e.g., pair the convertible head wearable audio device 405 with the remote device 495, receive audio inputs, perform active noise cancellation, generate audio outputs, transmit audio outputs, etc.). Alternatively, some or all of the modules 510-550 may be configured as hardware (e.g., electrical circuitry with discrete components, logic circuits, a field programmable gate array (FPGA), an application specific integrated circuit (ASIC), dedicated electrical circuits, etc.). Some, or all of the modules 510-550 may be stored on a memory of a remote device (e.g., memory 497) and may be executed by a processor of the remote device (e.g., processor 496).

A processor (e.g., processor 486) may execute the microphone mute module to, for example, cause the processor to mute at least one microphone input (e.g., microphone input 436 and/or microphone input 437) in response to a microphone boom (e.g., microphone boom 235*a*) being oriented into an inactive orientation. The processor 486 may execute the monophonic/stereophonic module 545 to, for example, cause the processor 486 to generate a stereophonic speaker output 422, 447 when, for example, the convertible head wearable audio device is configured as a headphone with dual earpieces (e.g., headphone 200*a-d* of FIGS. 2A-D). The processor 486 may execute the monophonic/stereophonic module 545 to, for example, cause the processor 486 to generate a monophonic speaker output 422 when, for example, the convertible head wearable audio device is configured as a headset with a single earpiece (e.g., headset 300*b,c* of FIGS. 3A and 3B). The processor 486 may generate a monophonic speaker output 422 that is, for example, representative of any one of: a left channel of a stereophonic speaker output, a right channel of a stereophonic speaker output, or a combination of a left channel of a stereophonic speaker output and a right channel of a stereophonic speaker output.

Figure 6:
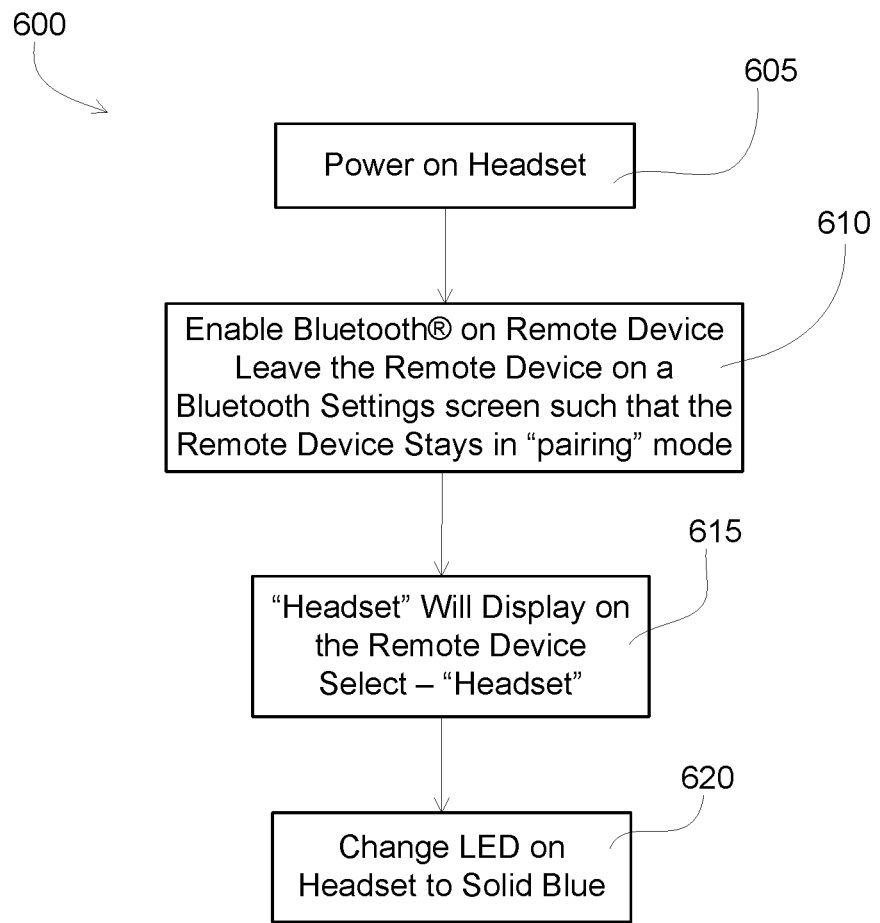
FIG. 6 depicts a flow diagram for an example method of wirelessly connecting a convertible head wearable audio device to a remote device.

With reference to FIG. 6, a method 600 of wirelessly connecting a convertible head wearable audio device (e.g., convertible head wearable audio device 100*a* of FIG. 1A, 200*a-e* of FIGS. 2A-E, 300*a-c* of FIGS. 3A-C, 405 of FIG. 4, or 505 of FIG. 5) to a remote device 400 may be implement by, for example, a processor (e.g., processor 486 of FIG. 4) of a convertible head wearable audio device (e.g., a convertible head wearable audio device 405 of FIG. 4) and a processor (e.g., processor 496 of FIG. 4) of a remote device (e.g., a remote device 495 of FIG. 4) each executing a portion of the modules 488 and 498 of FIG. 4 or a portion of the modules 510-550 of FIG. 5.

In particular, the processor 486 may execute the user input receiving module 510 to, for example, cause the processor 486 to receive a power on input (e.g., power on input 430) in response to, for example, a user pressing a multi-function button (e.g., multi-function button 230*d* of FIG. 2D) (block 605). When the processor 486 turns on the convertible head wearable audio device 405 (block 605), the processor 486 may execute the audio output module 550 to, for example, cause the processor 486 to generate a speaker output (e.g., speaker output 422, 447 of FIG. 4), and may cause a speaker (e.g., speaker 222*a* and/or speaker 247*b*) to emit a "Power on" sound (block 605).

When a convertible head wearable audio device 405 is powered on for a first time, the processor 486 may execute a wireless device pairing module 540 to cause the processor 486 to cause the convertible head wearable audio device 405 to automatically enter a pairing mode (block 610). Subsequent to the convertible head wearable audio device 405 being powered on for a first time, the processor 486 may execute a wireless device pairing module 540 to cause the processor 486 to cause the convertible head wearable audio device 405 to automatically attempt to connect the convertible head wearable audio device 405 with a most recently-paired remote device 495 (block 610).

When the convertible head wearable audio device 405 is turned on for the first time or when the convertible head wearable audio device 405 fails to automatically connect 405 with a most recently-paired remote device 495 (block 610), the processor 496 may further execute the wireless device pairing module 540 to cause the processor 496 to cause the remote device 495 to enter a pairing mode (block 610).

The processor 496 may execute a user interface generation module 515 to, for example, cause the processor to display a "HEADSET" icon (block 615). The processor 496 may further execute the wireless device pairing module 540 to cause the processor 496 to pair with the processor 486 in response to, for example, a user selecting the "HEADSET" icon (block 615).

Once the convertible head wearable audio device 405 is powered on (block 605) and the user selects the "HEADSET" icon (block 615), the processor 486 may execute the indicator status generation module 520 to, for example, cause the processor 486 to generate a user interface display 425 (e.g., a LED indicator blink blue) (block 610). The processor 486 may further execute the audio output module 550 to, for example, cause the processor to generate a speaker output 422, 447 and may cause a speaker 222*a*, 247*b* to emit a "pairing" sound (block 610).

Once the convertible head wearable audio device 405 and the remote device 495 are paired (block 620), the processor 486 may execute the indicator status generation module 520 to, for example, cause the processor 486 to generate a user interface display 425 (e.g., a LED may be illuminated solid blue) (block 610).

Alternatively, the processor 486 may execute the wireless device pairing module 540 to cause a convertible head wearable audio device 405 and a remote device 495 to automatically connect any time a Bluetooth® function is enabled and the remote device 495 is within range of the convertible head wearable audio device 405.

As another alternative, the processor 486 may cause the convertible head wearable audio device 405 to enter pairing mode again by: 1) If the headphone is on, turn the convertible head wearable audio device 405 off by pressing and holding the multi-function button 230*d* until the processor 486 causes the convertible head wearable audio device 405 to turn off; 2) release the multi-function button; 3) press and hold the multi-function button 230*d*; and 4) the processor 486 may cause the LED indicator 425 to blink blue and red, and the sound "pairing."

When a convertible head wearable audio device 405 is paired with a remote device, the convertible head wearable audio device 405 may be ready to make telephone calls and/or stream music via communication with the remote device.

Figure 7:
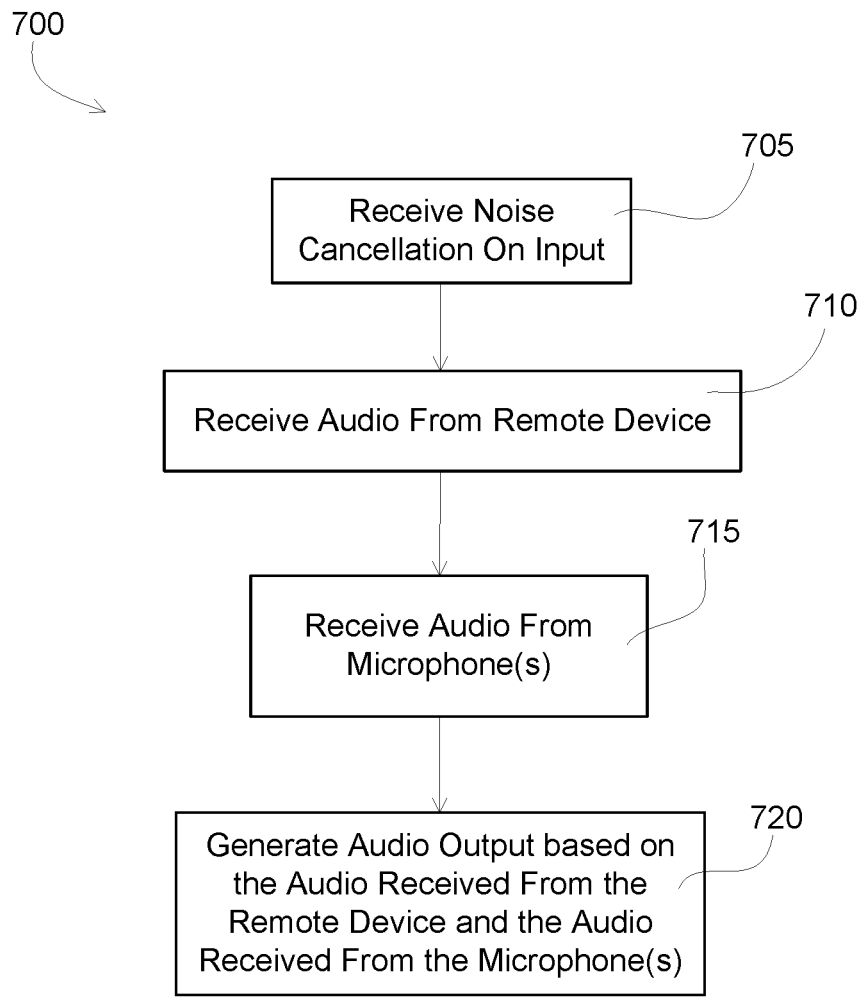
FIG. 7 depicts a flow diagram for an example method of cancelling noise within a convertible head wearable audio device.

Turning to FIG. 7, a method of cancelling noise within a convertible head wearable audio device 700 may be implemented by, for example, a processor (e.g., processor 486 of FIG. 4) of a convertible head wearable audio device (e.g., a convertible head wearable audio device 405 of FIG. 4) or a processor (e.g., processor 496 of FIG. 4) of a remote device (e.g., a remote device 495 of FIG. 4) each executing a portion of the modules 488 and 498 of FIG. 4, 510-550 of FIG. 5.

In particular, the processor 486 may execute the user input receiving module 510 to, for example, cause the processor 486 to receive an advanced noise cancellation input 424 from an active noise cancellation slider switch (e.g., active noise cancellation slider 124*a* of FIG. 1A) (block 705). The processor 486 may execute the audio receiving module 530 to, for example, cause the processor 486 to receive an audio input (e.g., audio input 429) (block 710). The processor 486 may further execute the audio receiving module 530 to, for example, cause the processor 486 to receive at least one microphone input (e.g., microphone input 436, microphone input 437, or microphone input 494 of FIG. 4) (block 715).

The processor 486 may execute the noise cancellation module 535 to, for example, cause the processor 486 to generate a reduce noise audio signal by cancelling a noise signal from a noisy audio signal (block 720). For example, the processor may receive a signal from a microphone input 437 (e.g., from a microphone 137*a*) and/or a microphone input 494, that is indicative of ambient noise surrounding the convertible head wearable audio device 405, and subtract the signal received from the microphone input 437 (e.g., from a microphone 137*a*) and/or the microphone input 494 from an audio signal that includes a noise component.

The processor 486 may implement active noise cancellation to allow a user of a convertible head wearable audio device 405 to reduce, or eliminate, ambient noise from a listening experience of the user. The processor 486 may implement active noise-cancellation by use of a microphone 137*a* and/or microphone input 494, an amplifier, and a speaker to pick up, amplify, and play ambient noise in phase-reversed form. Thereby, the processor 486 may cancel out unwanted noise from the environment without affecting the desired sound source, which is not picked up and reversed by the microphone. The processor 486 may attenuate ambient noise by 20 dB or more to reduce, for example, low-frequency engine and travel noise in aircraft, trains, and automobiles, and are less effective in environments with other types of noise.

A user may turn active noise cancellation on and off independently, regardless of whether a convertible head wearable audio device 405 Bluetooth power is turned on or off. This allows a user to use active noise cancellation (ANC) even when the user is using an audio cable connection (e.g., audio cable connection 229*d* of FIG. 2D) for "wired mode" usage.

A user may press, long-press, and hold the buttons (e.g., a volume increase button 227*d*, a volume decrease button 228*d*, or a multi-function button 230*d*) on a convertible head wearable audio device 200*d*. Each button press may result in a different function (e.g., a Press: Press the button firmly and release it immediately; a Long-press: Press the button firmly, and keep it depressed for about a second; or a hold: Press and hold the button down for the amount of time listed).

The convertible head wearable audio device 200*d* may include a battery (not shown in FIG. 2D) within, for example, the first earpiece housing 220*d*. The battery may be charged by connecting a USB cable to the micro-USB port 226*d* and a battery charger. If the battery level is low when the convertible head wearable audio device 200*d* is power on, the processor 486 may execute the audio output module 550 to cause the processor 486 to generate an speaker output 422, 447 to cause a speaker to emit a "Battery low" sound. The battery may provide more than twenty hours of talk time, and more than twenty hours of music playback time, wirelessly.

When a convertible head wearable audio device 200*d* is in a call mode, a user may answer incoming calls, and use, for example, an associated remote device (e.g., a smartphone) voice assistant to make hands-free calls. A convertible head wearable audio device 200*d* user may answer a call by, for example, pressing a multi-function button 230*d*. Similarly, a call may be ended by pressing the multi-function button 230*d*. A user may ignore a call by press and hold the multi-function button 230*d*. A user may hold down the multi-function button 230*d* (e.g., over 5 seconds) to cause the convertible head wearable audio device 200*d* to power down.

A user may redial a previously dialed telephone number by double-pressing the multi-function button 230*d*. A user may wake up a smartphone's voice assistant by pressing and holding the multi-function button 230*d* for a predetermined period of time (e.g., 3 seconds).

A user may answer an incoming call by pressing the multi-function button 230*d*. The convertible head wearable audio device 200*d* may beep once to confirm the call is answered. The call may be live immediately. To end a call the multi-function button 230*d* may be pressed to hang up. The convertible head wearable audio device 200*d* may beep once to confirm that the call is ended.

To ignore an incoming call, a user may press and hold the multi-function button 230*d* for about two seconds. The convertible head wearable audio device 200*d* may beep once to confirm that the call is ignored.

A user may redial a last dialed number by quickly pressing the multi-function button 230*d* twice. The convertible head wearable audio device 200*d* may beep once to confirm that the number is redialed. The pivotal microphone boom may provide an easy way to mute or unmute a microphone when a user is on a call. To mute the call, the microphone boom may be reoriented up and away from the users mouth to, for example, sixty-five degrees or more above horizontal.

To unmute the call, the microphone boom may be reoriented back down in front of the user's mouth. A user may press the volume buttons to turn the volume of the call up or down. For example, sixteen different volume levels may be available. To change the volume, a user may press a volume increase button 227*d* to increase the volume. The user may press a volume decrease button 228*d* to decrease the volume. The convertible head wearable audio device 200*d* may beep when the convertible head wearable audio device 200*d* reaches a lowest or a highest volume setting. Depending on the remote device, the volume buttons 227*d*, 338*d* may behave differently. On some remote devices the convertible head wearable audio device 200*d* volume buttons may control the remote device volume instead of the convertible head wearable audio device 200*d* volume.

To play or pause music, a user may press the multi-function button 230*d* while in music mode. A next or previous song may be accessed by, for example, a long-press volume increase button or volume decrease button. A user may connect a convertible head wearable audio device 200*d* to any standard 3.5 mm audio auxiliary jack by connect a 3.5 mm audio cable to the audio input jack 223*d*.

A user may restore a convertible head wearable audio device 200*d* back to the convertible head wearable audio device 200*d* factory state by powered off the convertible head wearable audio device 200*d* and then pressing and holding the multi-function button 230*d* to place the headphone in pairing mode. The user may then press and hold the volume increase button 227*d* and the multi-function button 230*d* at the same time until the convertible head wearable audio device 200*d* generates, for example, two beeps. The convertible head wearable audio device 200*d* pairing history may be cleared and the convertible head wearable audio device 200*d* is in pairing mode. The user can turn of the convertible head wearable audio device 200*d* or may proceed to pair it with remote device(s).

A convertible head wearable audio device 200d may be simultaneously connected to more than one remote device. For example, to add new connections after connecting to a first device, the convertible head wearable audio device 200d may be turned off, then the user may press and hold the multi-function button 230d. The convertible head wearable audio device 200d may enter a pairing mode. Follow the steps for the particular remote device (e.g., smartphone, laptop, tablet, etc.) to connect to the convertible head wearable audio device 200d.

A convertible head wearable audio device 200d may be "rebooted" by pressing and holding the multi-function button 230d and the volume increase button simultaneously. The convertible head wearable audio device 200d may then turn off. A user may press the multi-function button 230d to turn on the convertible head wearable audio device 200d and resume operation.

A convertible head wearable audio device (e.g., convertible head wearable audio device 100a of FIG. 1 may be provided with an audio cable, a charging cable, a carrying case, a drawstring pouch, a detachable headpad pre-assembled to the convertible head wearable audio device 100a, and a detachable earpiece. Alternatively, a convertible head wearable audio device 100a may be provided with an audio cable, a charging cable, a hard-sided carrying case, a detachable earpiece pre-assembled to the convertible head wearable audio device 100a, and a detachable headpad.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A convertible head wearable audio device, comprising:
   a headband, wherein a first end of the headband includes a first earpiece, and wherein
   a second end of the headband includes a receptacle;
   a wireless interface, wherein the wireless interface is configured to communicatively couple the convertible head wearable audio device to a remote device;
   an active noise cancellation module, wherein the active noise cancellation module is configured to reduce ambient noise from an audio output of the convertible head wearable audio device; and
   a stereophonic-to-monophonic audio output conversion module, wherein the stereophonic-to-monophonic audio output conversion module is configured to automatically convert an audio output of the convertible head wearable audio device to a stereophonic audio output when a second earpiece is plugged into the receptacle, and wherein the stereophonic-to-monophonic audio output conversion module is configured to automatically convert the audio output of the convertible head wearable audio device to a monophonic audio output when a headpad is plugged into the receptacle.

2. A convertible head wearable audio device as in claim 1, further comprising:
   a microphone boom pivotally attached to the first earpiece.

3. A convertible head wearable audio device as in claim 2, further comprising:
   a microphone mute input, wherein the microphone mute input is configured to mute a microphone audio input when the microphone boom is pivoted into a center orientation, and wherein the microphone mute input is configured to activate a microphone audio input when the microphone boom is pivoted into either a right-hand orientation or a left-hand orientation.

4. A convertible head wearable audio device as in claim 1, wherein the first earpiece includes at least one of: a volume increase button, a volume decrease button, a micro-USB port, a 3.5 mm audio input, a multi-function button, an active noise cancellation on-off slider switch, or a head wearable audio device status indicator.

5. A convertible head wearable audio device as in claim 4, further comprising:
   a battery, wherein the battery is configured to receive electrical energy via the micro-USB port.

6. A convertible head wearable audio device as in claim 1, wherein the receptacle includes at least one of: a microphone positive contact, a microphone negative contact, a speaker positive contact, a speaker negative contact, a microphone voltage at a common collector ($V_{cc}$), or an engagement mechanism.

7. A convertible head wearable audio device as in claim 6, wherein the engagement mechanism includes a pushbutton and a clasp, wherein the clasp is configured to engage at least one of: a hook of a headpad or a hook of an earpiece when the pushbutton is not pressed, and wherein the clasp is configured to disengage the at least one of: the hook of the headpad or the hook of the earpiece when the pushbutton pressed.

8. A convertible head wearable audio device, comprising:
   a headband, wherein a first end of the headband includes a first earpiece, wherein a second end of the headband includes a receptacle, wherein the receptacle includes an engagement mechanism and at least one electrical contact, wherein the engagement mechanism includes a pushbutton and a clasp, wherein the clasp is configured to engage at least one of: a hook of a headpad or a hook of a second earpiece when the pushbutton is not pressed, and wherein the clasp is configured to disengage the at least one of: the hook of the headpad or the hook of the second earpiece when the pushbutton pressed; and
   a stereophonic-to-monophonic audio output conversion module, wherein the stereophonic-to-monophonic audio output conversion module is configured to automatically convert an audio output of the convertible head wearable audio device to a stereophonic audio output when the second earpiece is plugged into the receptacle, and wherein the stereophonic-to-monophonic audio output conversion module is configured to automatically convert the audio output of the convertible head wearable audio device to a monophonic audio output when the headpad is plugged into the receptacle.

9. A convertible head wearable audio device as in claim 8, further comprising:
   a wireless interface, wherein the wireless interface is configured to communicatively couple the convertible head wearable audio device to a remote device.

10. A convertible head wearable audio device as in claim 8, further comprising:
    an active noise cancellation module, wherein the active noise cancellation module is configured to reduce ambient noise from an audio output of the convertible head wearable audio device.

11. A convertible head wearable audio device as in claim 8, further comprising:
    a battery, wherein the battery is configured to receive electrical energy via a micro-USB port.

12. A convertible head wearable audio device as in claim 8, wherein the receptacle includes at least one of: a microphone positive contact, a microphone negative contact, a speaker positive contact, a speaker negative contact.

13. A convertible head wearable audio device as in claim 8, wherein the receptacle includes a microphone positive contact and a microphone negative contact, and wherein the microphone positive contact and the microphone negative contact provide a microphone voltage at a common collector ($V_{cc}$) to a speaker.

14. A convertible head wearable audio device as in claim 8, further comprising:
   a microphone boom pivotally attached to the first earpiece; and
   a microphone mute input, wherein the microphone mute input is configured to mute a microphone audio input when the microphone boom is pivoted into a center orientation, and wherein the microphone mute input is configured to activate a microphone audio input when the microphone boom is pivoted into either a right-hand orientation or a left-hand orientation.

15. A convertible head wearable audio device, comprising:
   a headband, wherein a first end of the headband includes a first earpiece having a speaker, and wherein a second end of the headband includes a receptacle;
   at least one microphone input;
   an active noise cancellation module, wherein the active noise cancellation module is configured to receive an audio input from the at least one microphone input, wherein the audio input from the at least one microphone input includes a signal that is representative of ambient noise proximate the convertible head wearable audio device, wherein the active noise cancellation module is further configured to generate an audio output to the at least one speaker, and wherein the audio output having a reduce ambient noise signal component that is proportional to the signal that is representative of the ambient noise proximate the convertible head wearable audio device; and
   a stereophonic-to-monophonic audio output conversion module, wherein the stereophonic-to-monophonic audio output conversion module is configured to automatically convert an audio output of the convertible head wearable audio device to a stereophonic audio output when a second earpiece is plugged into the receptacle, and wherein the stereophonic-to-monophonic audio output conversion module is configured to automatically convert the audio output of the convertible head wearable audio device to a monophonic audio output when a headpad is plugged into the receptacle.

16. A convertible head wearable audio device as in claim 15, further comprising:
   a microphone boom pivotally attached to the first earpiece, wherein the at least one microphone input is connected to a microphone that is mounted to the microphone boom.

17. A convertible head wearable audio device as in claim 16, further comprising:
   a microphone mute input, wherein the microphone mute input is configured to mute an output of the microphone that is mounted to the microphone boom.

18. A convertible head wearable audio device as in claim 15, further comprising:
   a wireless interface, wherein the wireless interface is configured to communicatively couple the convertible head wearable audio device to a remote device.

19. A convertible head wearable audio device as in claim 18, wherein the at least one microphone input is connected to a microphone that is mounted to the remote device.

* * * * *